(12) United States Patent
Hofschulte et al.

(10) Patent No.: US 7,484,787 B2
(45) Date of Patent: *Feb. 3, 2009

(54) LONGITUDINAL SEAT ADJUSTMENT DEVICE

(75) Inventors: Wolfram-Heinrich Hofschulte, Bonndorf (DE); Michael Wöhrle, Niedereschach (DE); Frank Probst, Obereschach (DE); Fred Krimmel, Winterlingen (DE)

(73) Assignee: IMS Gear GmbH, Donaueschingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/608,365

(22) Filed: Dec. 8, 2006

(65) Prior Publication Data
US 2007/0096494 A1    May 3, 2007

Related U.S. Application Data

(63) Continuation of application No. 10/471,226, filed on Jan. 20, 2004, now Pat. No. 7,198,243.

(30) Foreign Application Priority Data
Mar. 5, 2001  (DE) ............................... 101 10 245
Mar. 5, 2002  (WO) ..................... PCT/EP02/02396

(51) Int. Cl.
*B60N 2/07* (2006.01)

(52) U.S. Cl. .............. 296/65.15; 296/65.13; 296/65.18; 248/429

(58) Field of Classification Search .............. 296/65.01, 296/65.13, 65.14, 65.15, 65.18; 248/429, 248/430, 432; 297/330, 362, 366.11, 344.1, 297/344.17, 362.11; 74/89.33
See application file for complete search history.

(56) References Cited

U.S. PATENT DOCUMENTS

| | | | |
|---|---|---|---|
| 4,790,202 A | 12/1988 | Hayashi et al. | 74/396 |
| 5,150,872 A | 9/1992 | Isomura | 1/8 |
| 5,207,473 A | 5/1993 | Nawa et al. | 296/65 |
| 5,303,983 A | 4/1994 | Gauger et al. | 22/26 |
| 5,467,957 A | 11/1995 | Gauger | 248/429 |
| 5,483,853 A | 1/1996 | Moradell et al. | 74/665 |
| 5,709,363 A | 1/1998 | Matsuhashi | 248/421 |
| 5,718,477 A | 2/1998 | Schuler | 297/341 |
| 5,746,409 A | 5/1998 | Rees | |
| 5,785,292 A | 7/1998 | Muraishi et al. | 248/429 |
| 5,882,075 A | 3/1999 | Partington et al. | 297/344 |
| 5,975,563 A * | 11/1999 | Gallagher et al. | 280/728.3 |
| 6,000,757 A | 12/1999 | Sovis | 297/344 |
| 6,244,660 B1 | 6/2001 | Yoshimatsu | 297/344 |
| 6,260,922 B1 | 7/2001 | Frohnhaus et al. | 2/2 |
| 7,051,986 B1 * | 5/2006 | Taubmann et al. | 248/429 |

(Continued)

FOREIGN PATENT DOCUMENTS

DE        42 27 846        9/1993

(Continued)

*Primary Examiner*—Jason S Morrow
(74) *Attorney, Agent, or Firm*—O'Shea Getz P.C.

(57) ABSTRACT

The invention relates to a longitudinal seat adjustment device having an upper rail and a lower rail. The upper rail sits in the lower rail. Between the two rails a spindle is fixedly connected to the lower rail. Drivable on the spindle is a transmission, which can be retained in a specific manner by slotted bridges in the case of a crash.

10 Claims, 12 Drawing Sheets

U.S. PATENT DOCUMENTS

| | | | |
|---|---|---|---|
| 2004/0206878 A1* | 10/2004 | Borbe et al. | 248/424 |
| 2005/0082890 A1* | 4/2005 | Taubmann et al. | 297/344.1 |
| 2005/0269478 A1* | 12/2005 | Woehrle et al. | 248/430 |
| 2006/0186687 A1* | 8/2006 | Kimura et al. | 296/65.13 |
| 2006/0226674 A1* | 10/2006 | Ito et al. | 296/65.13 |
| 2006/0249644 A1* | 11/2006 | Folliot et al. | 248/429 |
| 2007/0114355 A1* | 5/2007 | Koumura | 248/429 |
| 2007/0152485 A1* | 7/2007 | Ehrhardt | 297/344.1 |

FOREIGN PATENT DOCUMENTS

| | | | |
|---|---|---|---|
| DE | 196 42 655 | 4/1998 | |
| DE | 198 15 283 | 10/1999 | |
| DE | 198 44 817 | 4/2000 | |
| EP | 0 759 374 | 2/1997 | 2/2 |

* cited by examiner

LONGITUDINAL SEAT ADJUSTMENT DEVICE

PRIORITY INFORMATION

This application is a continuation of Ser. No. 10/471,226 filed Jan. 20, 2004 now U.S. Pat. No. 7,198,243.

BACKGROUND OF THE INVENTION

The invention relates to a longitudinal seat adjustment device.

Longitudinal seat adjustments generally have a lower rail fixed to a chassis, inside which lower rail and upper rail, to which the seat is attached, can be propelled by motor. A spindle fixed by its respective ends to the lower rail sits inside the upper rail, on which spindle a transmission fixedly coupled to the upper rail is arranged in axially movable fashion. The seat, which is located on the two upper rails arranged parallel to one another, can be propelled via a motor device that sits between the rails.

Examples of devices for the purpose of longitudinal seat adjustments have been disclosed in DE 36 40 197 A1, DE 42 08 948 C2, DE 196 42 655 C2, DE 198 15 283 A1, DE 198 44 817 A1, DE 199 44 690 A1, and WO 95/16 585. There is a need for a compact longitudinal seat adjusting device in which only a few components are needed and that can without difficulty accommodate the forces that occur especially in the case of a crash, and in particular for a transmission that transforms the rotational motion of the drive motor into a translational motion.

A further goal of the present invention is for the space occupied by the longitudinal seat adjusting device to be relatively small, preferably only 15 mm in width. Moreover, the permissible protrusion of the upper rail is likewise not to be too great, at most some 15 mm. Finally, the device according to the invention is to satisfy a strength requirement in both directions, which is for example 25000 N.

Finally, the device according to the invention is to be relatively rapidly adjustable, that is, for example at between 15 and 25 mm/s over a relatively long adjustment range of for example 300 mm.

SUMMARY OF THE INVENTION

In a preferred embodiment of the invention, the rotational motion of the motor is transformed to the translational motion via a flexible shaft, a worm, a spindle, and a spindle nut.

In order to reduce noise it is recommended that the spindle preferably be aligned exactly parallel to the upper rail and lower rail.

In another development of the invention, at least one of the wall parts of the upper rail is provided with a notch through which a flexible shaft coupled to a drive motor is guided.

In a further development of the invention, side walls of the upper rail are formed as slotted bridges and pressed into the interior of the upper rail, the transmission housing being able to be braced against these slotted bridges.

The transmission housing preferably includes two housing shells made of plastic, which are connected to one another by ultrasonic welding. The housing, which is connected by ultrasonic welding of the two housing halves, is advantageously designed only for compressive loading.

A clamping holding of the transmission is achieved according to the invention by metal stirrups bent into an L shape oppositely worked into a recess of the upper rail, between which stirrups the transmission housing is slipped with wall tapers.

The spindle nut and the above-mentioned thrust ring, which can brace itself in the walls of the upper rail in the case of a crash, are preferably formed integrally or in one piece. Both are preferably made of metal.

In another development, a worm seam is coaxially applied to the spindle nut by plastic injection.

The longitudinal seat adjustment functions as follows. The transmission is built into a U-shaped seat rail. This seat rail is comprised of a lower rail and an upper rail, as referred to above. The lower rail is connected to the body of the vehicle, while the upper rail is connected to the vehicle seat. The transmission housing is fixated on the upper rail via two lugs and is preferably secured with a dowel pin. The spindle nut itself is connected to the lower rail via two screws. The seat is adjusted via the translational motion of the spindle/spindle nut pair. Two rails and thus two transmissions (one left and one right) are required for the adjustment of one seat.

The principal function of the transmission includes transforming the rotational motion into a translational motion. The rotational motion is transmitted to the transmission by a motor and the adapted flexible shaft via a square integrated into the transmission worm. The spindle is driven via the injection-coated worm gear with a well-defined transmission ratio. The transformation to translational motion is effected via the spindle/spindle nut pair. A trapezoidal thread is available to both parts.

The transmission according to the invention is distinguished in particular by the fact that it can withstand very high forces in the case of a crash. The housing of the transmission is not itself capable of withstanding the forces in the case of a frontal crash. Such forces are around 24000 N. In the transmission according to the invention, the housing of the transmission is destroyed in the case of a crash and the thrust ring, which is preferably made of metal, can push against the contact surfaces of the upper rail on both sides.

The parts upper rail, thrust ring, spindle, spindle nut and lower rail in the longitudinal seat adjustment device according to the invention are situated in the force transmission path in the case of a crash and can advantageously withstand the crash forces.

The longitudinal seat adjustment device according to the invention is distinguished by the free positionability of the transmission on the rail, the integral forming of the thrust ring/spindle nut, a rotating nut, and a rotating spindle. Moreover, a larger travel distance results with the device according to the invention under the same installation conditions.

Moreover, the device according to the invention, or the transmission implemented therein, is distinguished by the following features.

The geared adjustment drive is composed of only four or five components. The gearing parts of the worm transmission are directly supported in a plastic cage. Separate support components can be dispensed with. The cage constituents are connected and fixated by ultrasonic welding via an individual lowering path with an eye to lash-free functioning of the gearing parts. The flexible shaft attachment is an integral constituent of the fixation of the transmission to the seat rail. The flexible shaft attachment provides a coaxial fixation of the rotating flexible shaft to the drive worm and is preferably fastened to the plastic cage via a bayonet connection with snap closure.

The transmission cage is connected to the seat rail in a lash-free but elastic manner via slotted bridges and rimmed holes in sheet metal and can be individually adapted in the assembly process. The spindle nut is simultaneously the worm gear and the thrust ring. The integrated thrust ring relieves the plastic transmission of crash forces in the case of a crash. The thrust ring here braces itself by projection on notches made in the seat rail.

The threaded spindle can be removed subsequently for purposes of assembly and repair.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
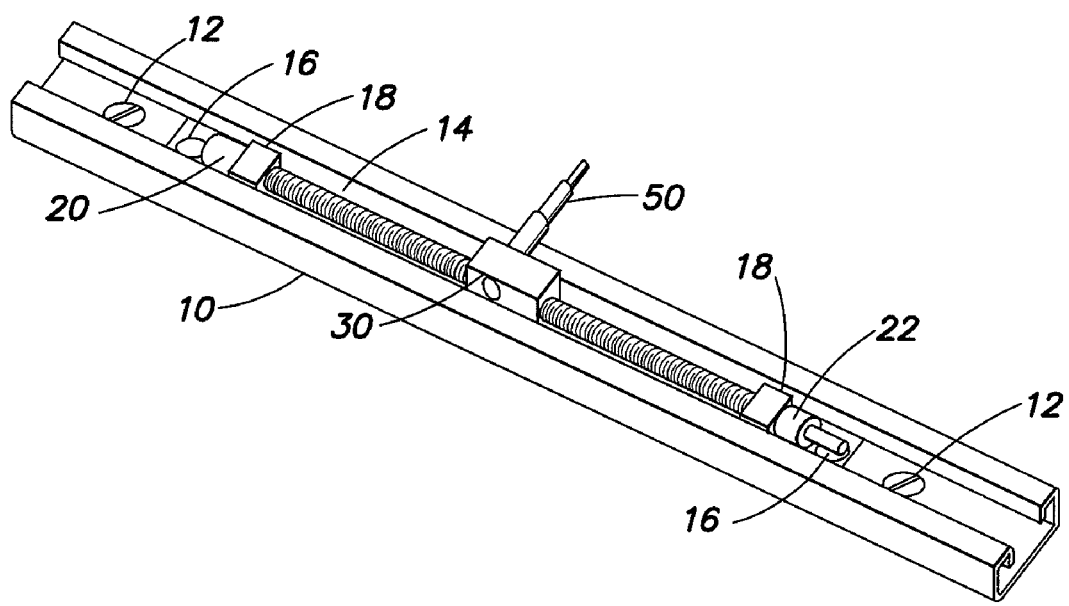
FIG. 1 is a perspective illustration of a lower rail with a spindle installed and a transmission sitting on the spindle.

FIG. 1 illustrates a spindle 14 that sits inside a lower rail with an O-shaped cross section, which is fixed to the chassis of a vehicle via mounting screws 12 at either end. The spindle 14 is fixedly arranged in a lower rail 10 at both its ends via an end stop 18. The connection between the spindle 14 and the lower rail 10 can be effected in arbitrary fashion. In the exemplary embodiment depicted, the spindle 14 is fastened to the bottom of the lower rail 10 via its end stops 18 with mounting rivets 16. The device includes an adjustment nut 20 and a stop nut 22. A transmission 30 is propellably arranged on the spindle and is driven by a flexible shaft 50. When the flexible shaft 50 rotates, the transmission moves to the left or right on the spindle 14, depending on the direction the flexible shaft 50 turns.

Figure 2:
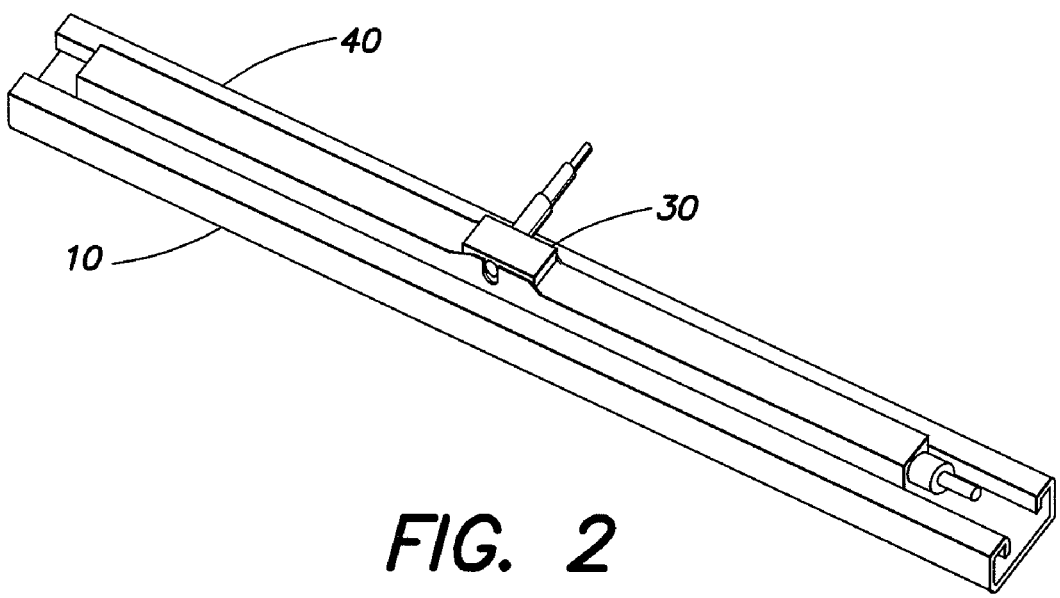
FIG. 2 is a perspective illustration of the rail of FIG. 1.

Referring to FIG. 2, an upper rail 40 is fixedly coupled to the transmission 30. A seat, preferably a seat of a motor vehicle, is fastened to the upper rail 40. The lower rail 10 together with the upper rail 40 and the transmission 30 are arranged parallel to one another under the seat to be adjusted. Between each such pair of rails sits a drive motor, which drives the flexible shaft 50 of each transmission 30 so that the seat can be moved toward the front or toward the rear.

Figure 3:
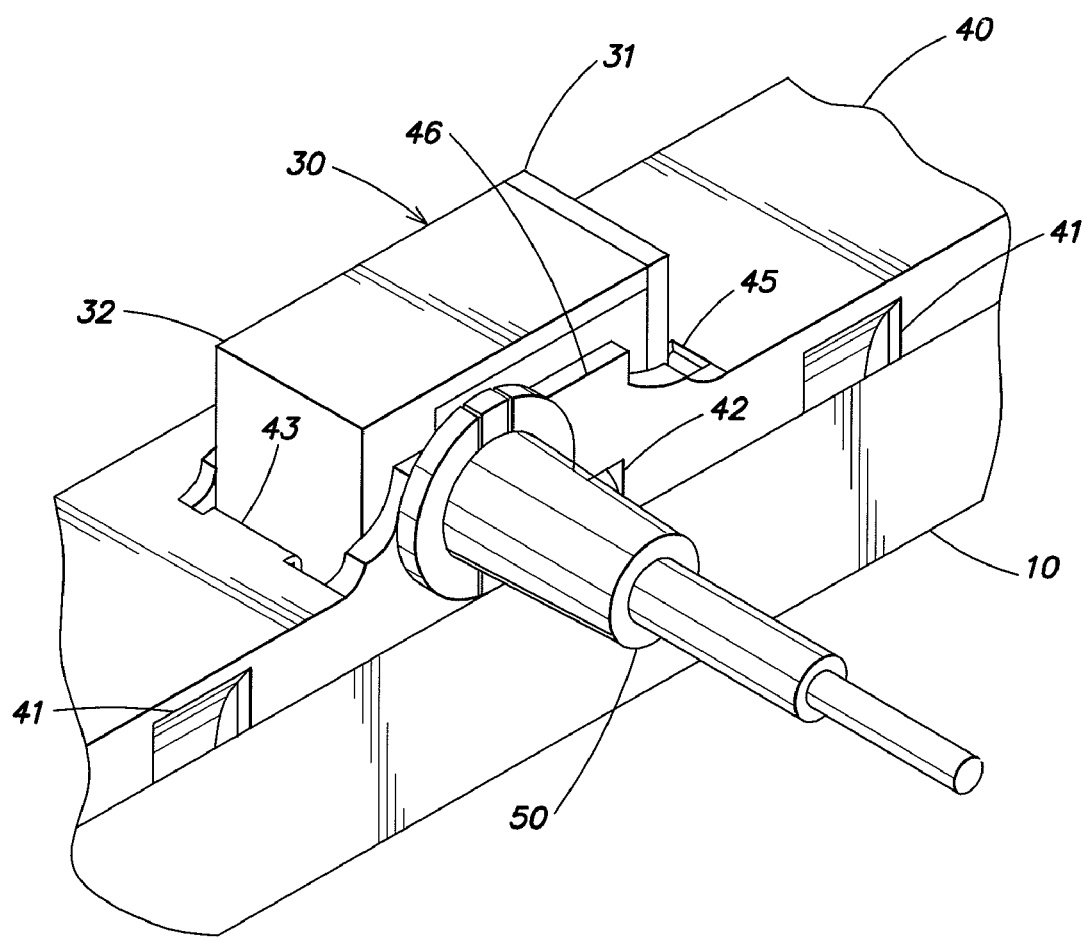
FIG. 3 illustrates the transmission held in the upper rail.
Figure 7:
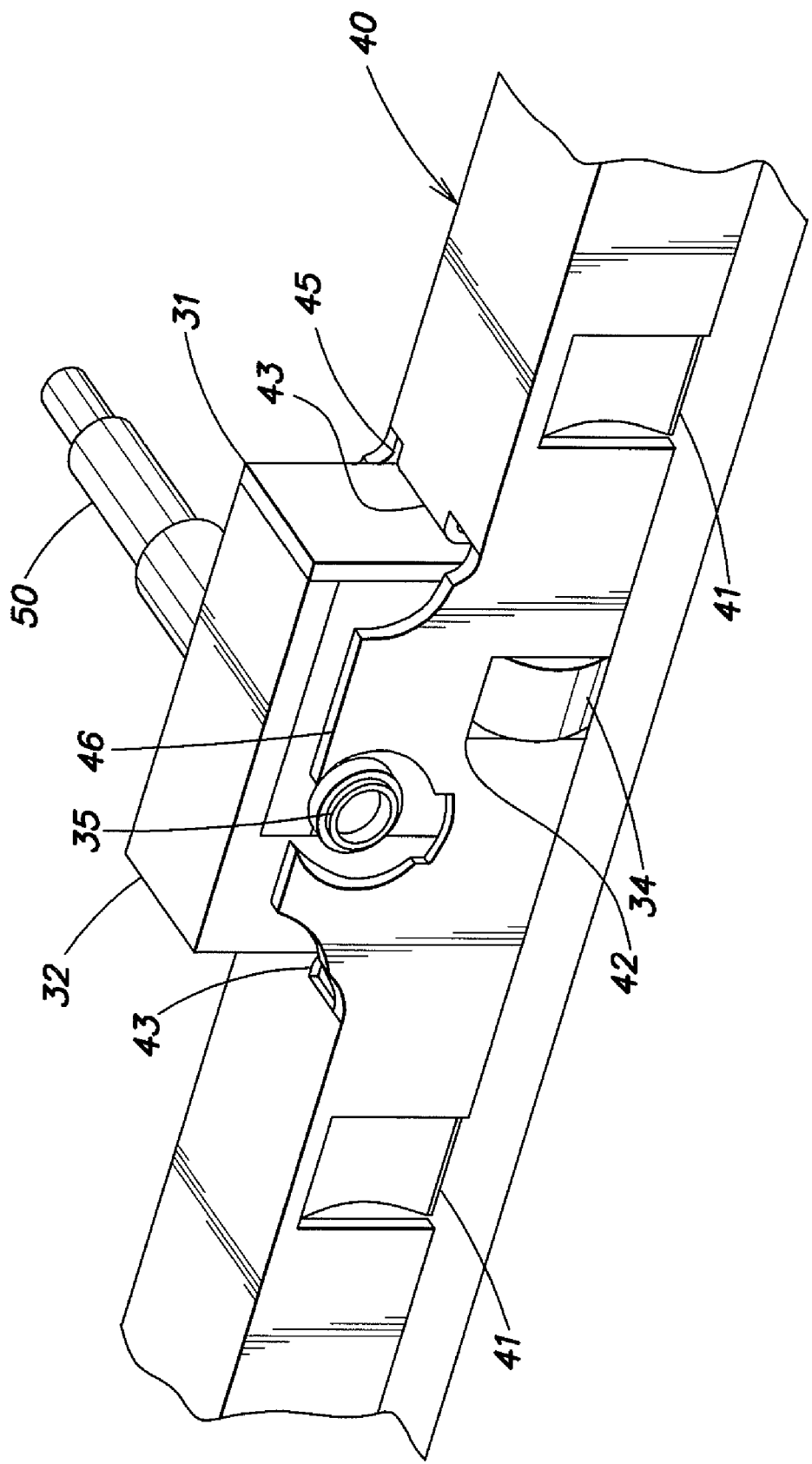
FIG. 7 illustrates the seat rail section in the transmission region.

The seat of the transmission in the upper rail 40 is depicted on an enlarged scale in FIG. 3. FIG. 7 gives a similar depiction, but viewed from the other side, with the lower rail omitted. In its upper wall part, the upper rail 40 has at its disposal a notch in which the box-shaped housing of the transmission 30 sits.

Figure 8:
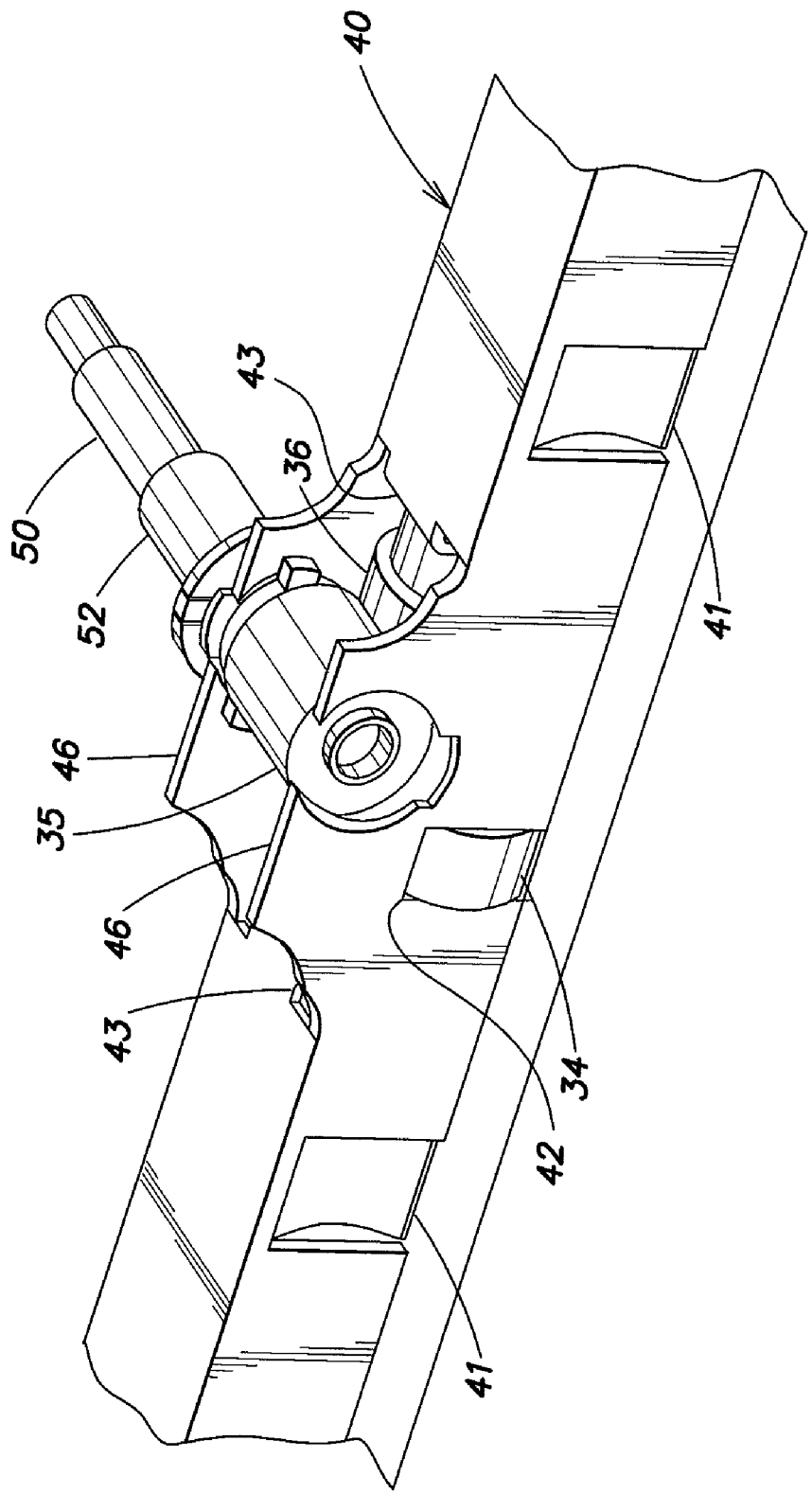
FIG. 8 illustrates the upper rail with opened housing.

The transmission 30 is clampingly held in the notch 45. For this purpose, wall sections of the upper wall are bent inwardly by 90° into the notch 45 and serve as a stop lug 43. Two of these stop lugs 43 are situated oppositely in the longitudinal direction of the upper rail 40. The stop lugs 43 can be seen in FIG. 8. Moreover, the box-shaped housing of the transmission 30 sits between two parallel wall sections 46, which extend upwardly in parallel fashion integrally from the side walls of the upper rail 40. Thus the transmission 30, which is formed from a housing top 31 and a housing bottom 32 and is preferably made of plastic, sits between the two above-mentioned stop lugs 43 and the wall sections 46. The wall section 46 facing toward the observer is provided with a hole through which the flexible shaft 50 intrudes into the interior of the housing of the transmission 30.

Slotted bridges 41 are pressed into the side walls of the upper rail 40. These are wall sections that have been pressed into the interior of the upper rail 40 through slots, parallel to one another, made in the side walls of the upper rail 40. Such slotted bridges 41 are located in pairs directly opposite one another. The slotted bridges 41 constrict the interior space of the upper rail 40 and serve (compare FIG. 9) as a stop for the housing top 31 and the housing bottom 32 of the transmission 30. A notch 42, which lies between the respectively arranged slotted bridges 41, are located oppositely in the two sides of the upper rail 40. The notch 42 serves for the partial accommodation of a thrust ring 34 in a manner explained below.

The flexible shaft 50 projects into the interior of the housing of the transmission 30 via a flexible shaft adapter 52. A worm 35, which is in engagement with a spindle nut 36, sits in the interior of the transmission 30 at the end of the flexible shaft adapter 52. The spindle nut 36 is provided with a worm gear. As seen FIG. 12 in particular, a thrust ring is integrally molded onto this spindle nut with a worm gear.

The spindle nut, the worm gear and the thrust ring are preferably made of metal. In addition, there can also be a plain washer 37 inside the transmission 30. The housing of the transmission 30, comprised of the housing bottom 32 and the housing top 31, is made of plastic and has box-shaped parts 31a and 32a through which the spindle 14 is guided. The ends of the box-shaped parts 31a and 32a find their stop on the above-mentioned slotted bridges 41. When the transmission is propelled via the flexible shaft 50, the upper rail is carried along the spindle and thus inside the lower rail 10 by the totality of the arrangement of transmission and upper rail as described.

Figure 9:
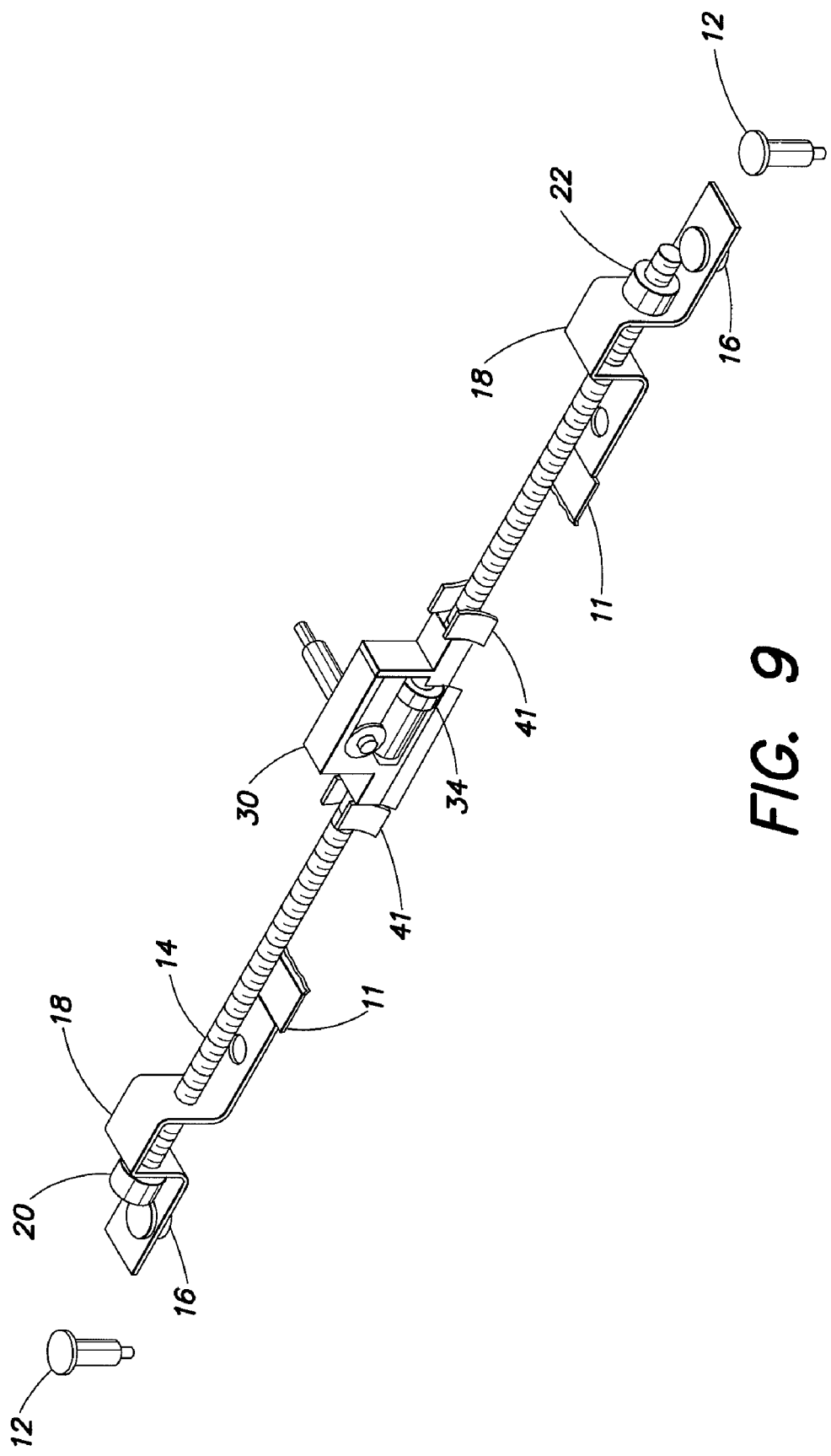
FIG. 9 illustrates fastening of the transmission to the lower rail.

As illustrated in FIG. 9, the slotted bridges 11 can also be made in the bottom wall of the lower rail. The slotted bridges 11 are likewise wall sections bent or impressed toward the upper rail, which wall sections as shown in FIG. 9, are arranged oppositely to the mounting rivets 16 in front of the respective end stops 18.

As shown in FIG. 9, in the case of a crash the axial acceleration of the seat that occurs is intercepted both by the slotted bridges 11 and 41 and also by the thrust ring in cooperation with the notch in the upper rail 40. The slotted bridges 11 and 41 are in each case arranged in pairs to ensure effective bracing of the adjustment device of the seat adjustment regardless of whether the acceleration is toward the front or the rear in the case of a crash. In addition, the thrust ring 34, in cooperation with the notch of the upper rail, likewise works up the force that occurs upon forward or backward acceleration.

As shown in FIG. 9, the end stops 18 are formed by U-shaped brackets. The spindle 14 protrudes through the longitudinal arms of these U-shaped brackets, retaining shackles being provided at the ends of these U-shaped brackets through which the mounting rivets 16 are guided.

Figure 4:
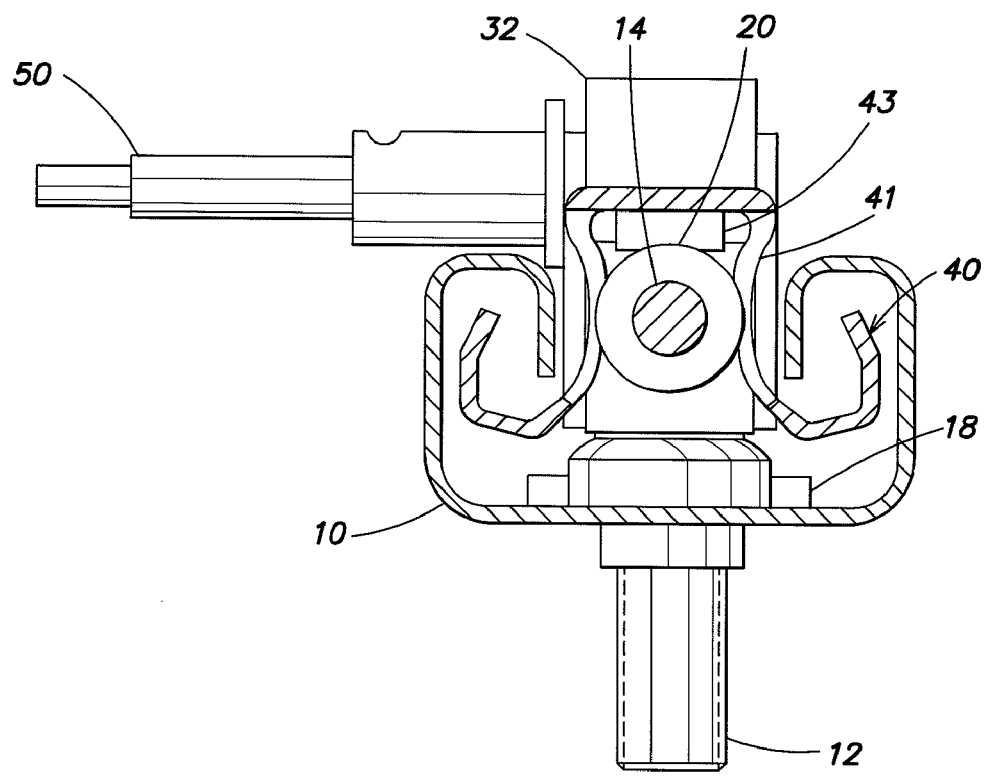
FIG. 4 is an end-on view of the arrangement depicted in FIG. 2 and FIG. 3 in end-on view.

The device depicted in FIG. 1 to FIG. 3 is depicted in FIG. 4 as an end-on cross-sectional view of the seat rail. The reference characters already explained again stand for the known parts. As shown in FIG. 4, 4 the lower rail 10, which is U-shaped in cross section, has inwardly reflexed wall parts. Outwardly reflexed wall parts of the upper rail 40 intrude between these inwardly bent wall parts of the lower rail 10, as viewed from the side walls of the upper rail 40. This ensures that upper rail 40 and lower rail 10 cannot become laterally offset. Moreover, some guidance is provided.

Figure 5:
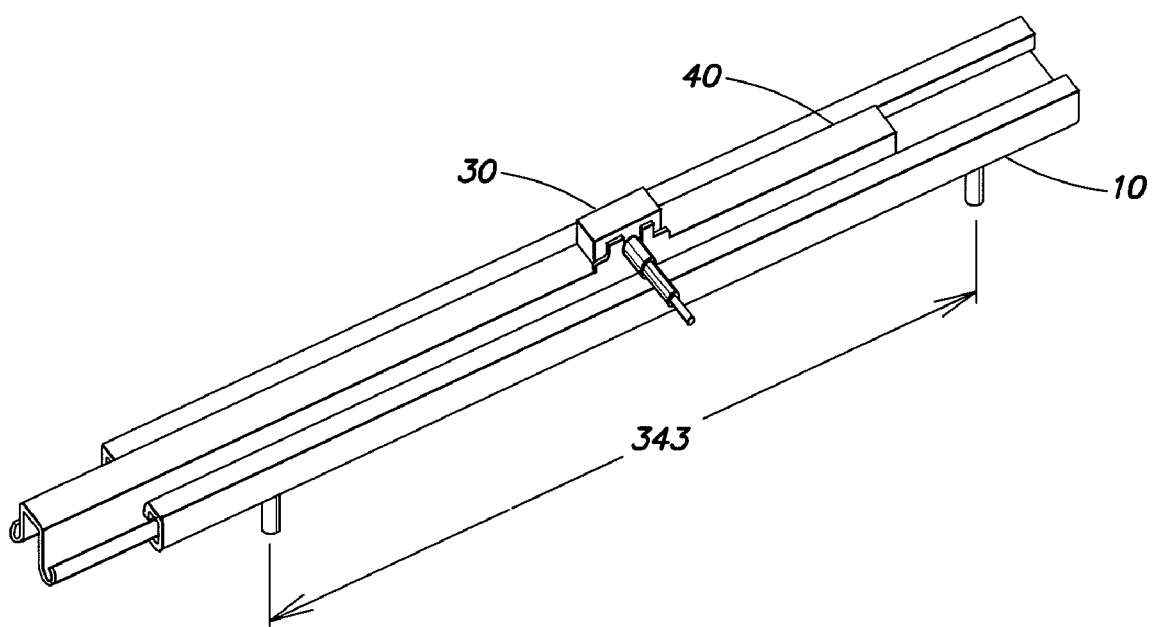
FIG. 5 illustrates for one embodiment dimensional information on the travel distance of the upper rail relative to the lower rail in mm.

FIG. 5 illustrates schematically the possible travel distance between the upper rail and the lower rail. In the present exemplary embodiment, 343 mm is provided as a possible travel distance.

Figure 6:
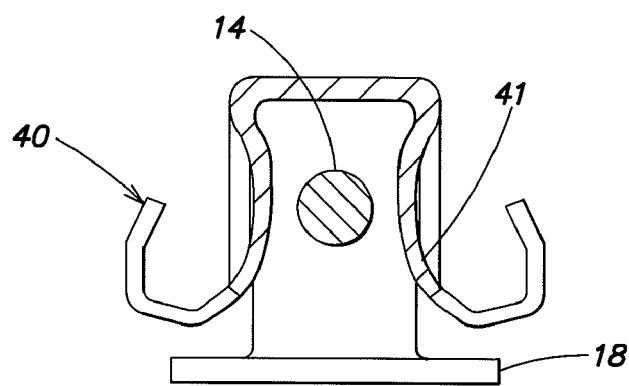
FIG. 6 is a detailed view of the end stop overlap.

FIG. 6 illustrates in cross-sectional view, the slotted bridges made in the upper rail 40, which markedly constrict the interior space in the U-shaped upper rail and thus serve as a stop for the transmission 30.

Figure 10:
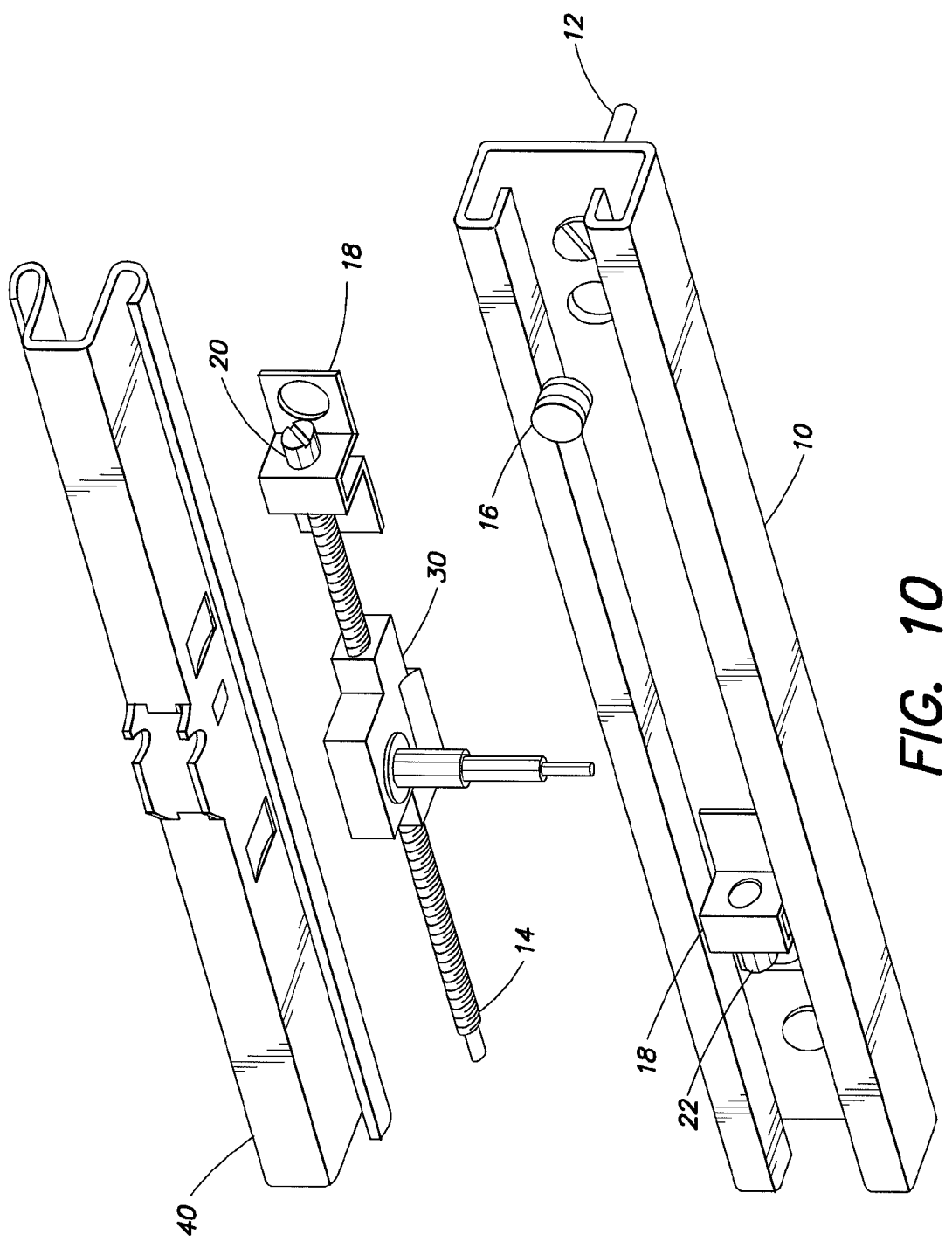
FIG. 10 illustrates an assembly sequence for the device according to the invention.

FIG. 10 illustrates the upper rail 40 and the lower rail 10 together with the above-described individual components in exploded view. Components discussed above are provided with the same reference characters as above.

Figure 11:
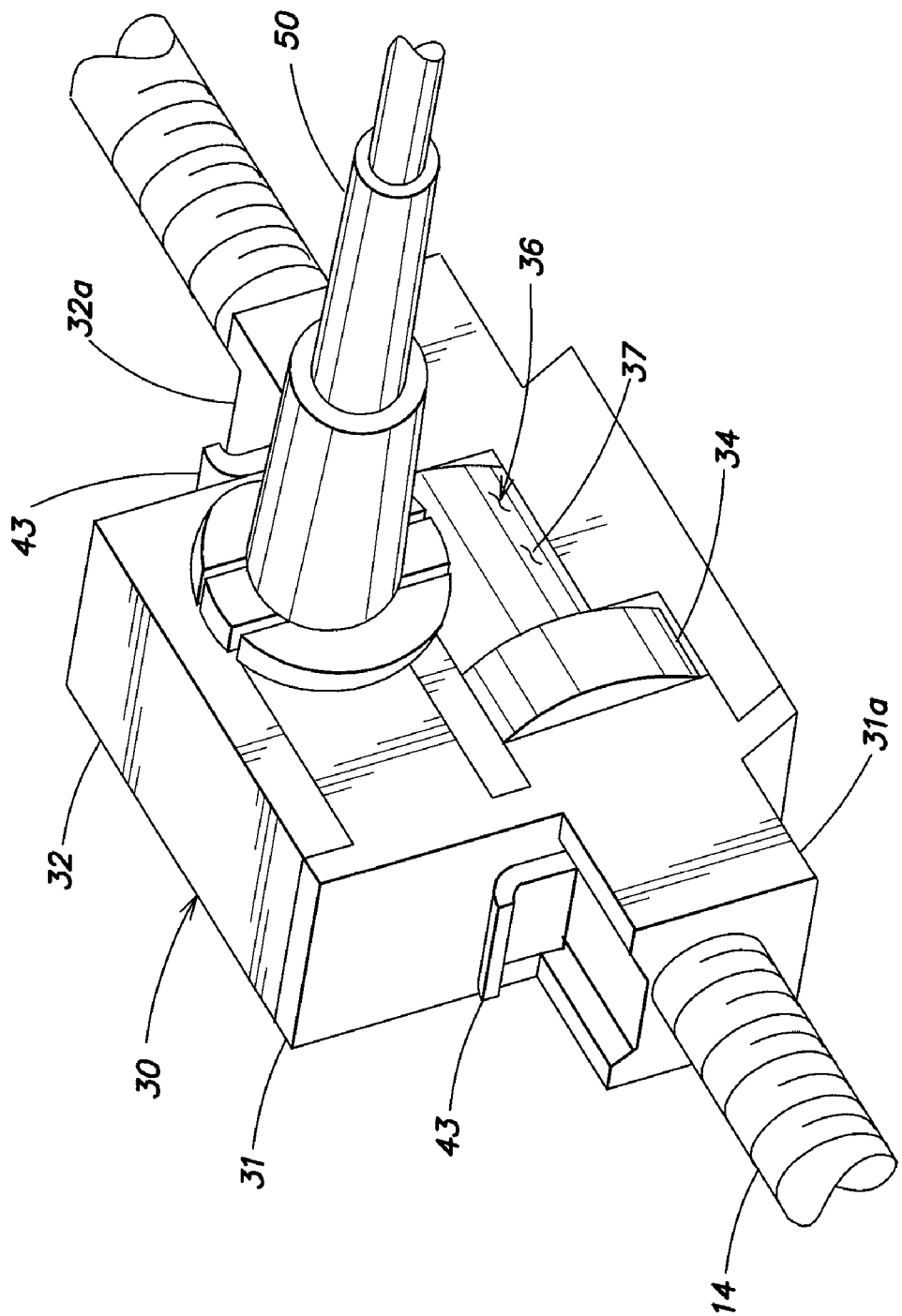
FIG. 11 illustrates the region of the transmission on an enlarged scale.

The transmission 30 is drawn in FIG. 11 with the housing bottom 32 and the housing top 31 together with box-shaped integrally molded elements in the assembled condition. The stop lugs inwardly turned over from the upper wall of the upper rail 40 can also be seen in this depiction.

Figure 12:
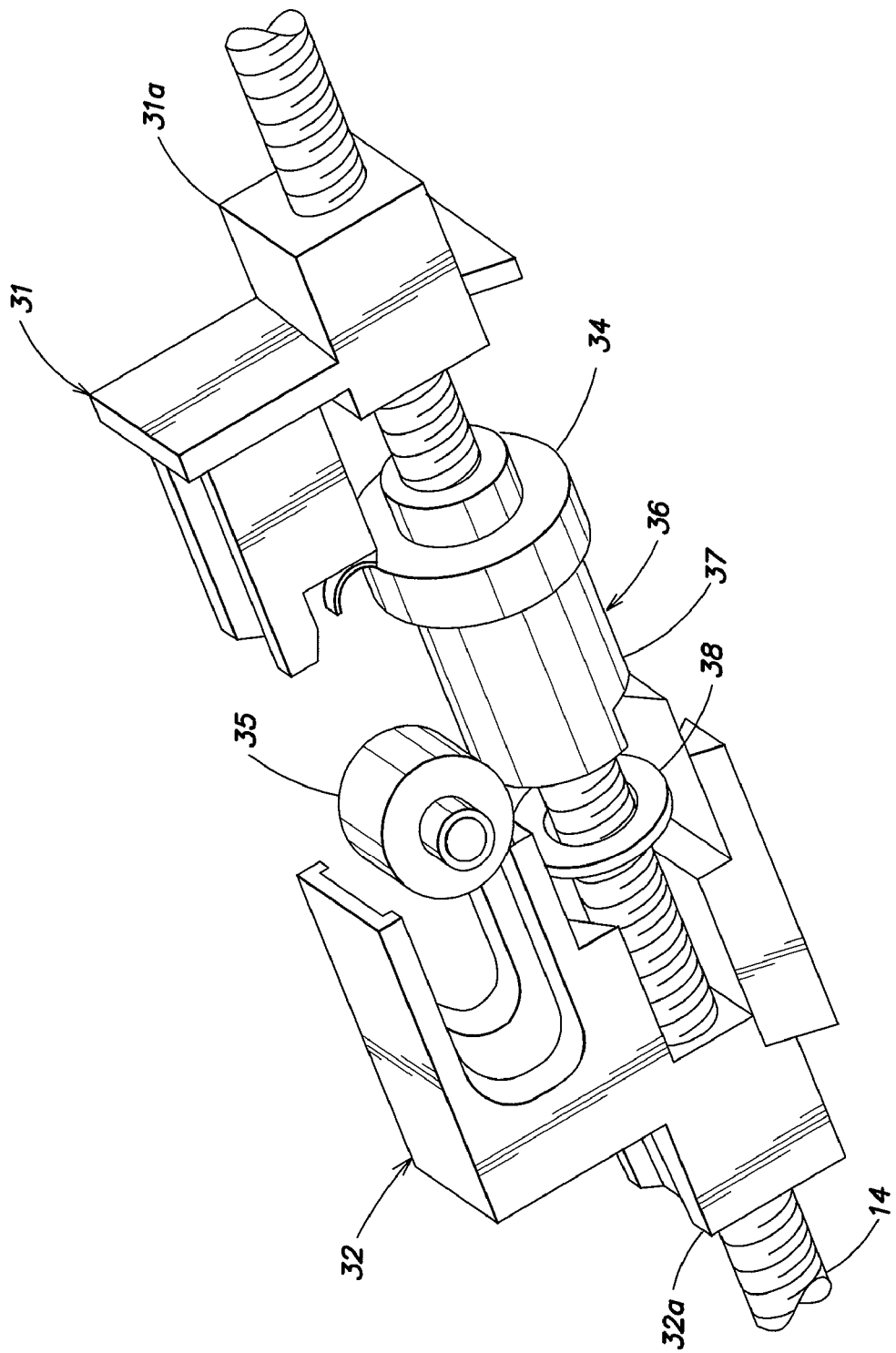
FIG. 12 illustrates the transmission in an exploded view.

The thrust ring 34 extends forth laterally from the housing of the transmission 30. FIG. 12, already explained, shows the transmission in an exploded view. Here the spindle nut 36 together with the worm gear and the integrally molded thrust ring 34 can be seen clearly. The worm 35, which is driven by the flexible shaft, engages with the worm gear 37. The transmission is moved along the spindle 14 by this drive.

Figure 13:
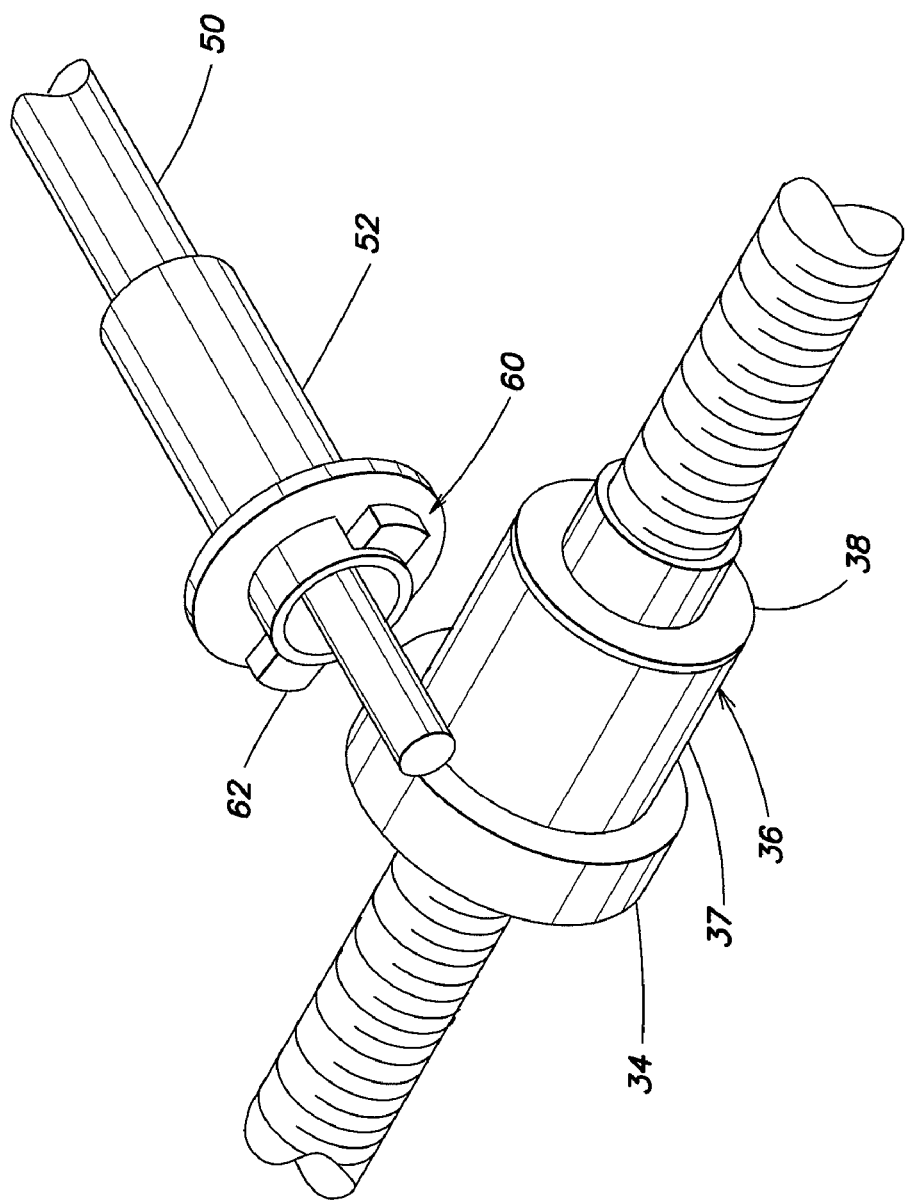
FIG. 13 illustrates the flexible shaft adapter.
Figure 14A:
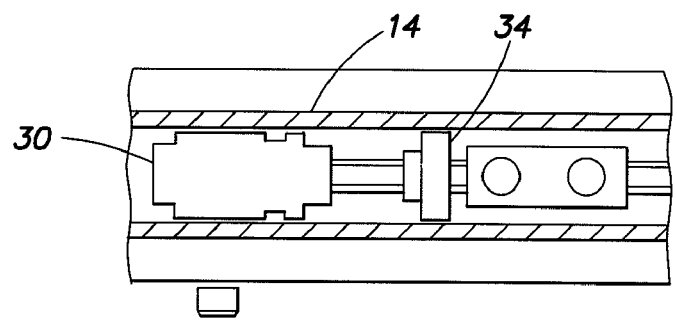
FIGS. 14A-14C present detailed views to explain the accommodation of crash forces with the device according to the invention.
Figure 14B:
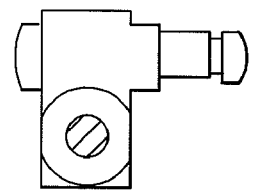
Figure 14C:
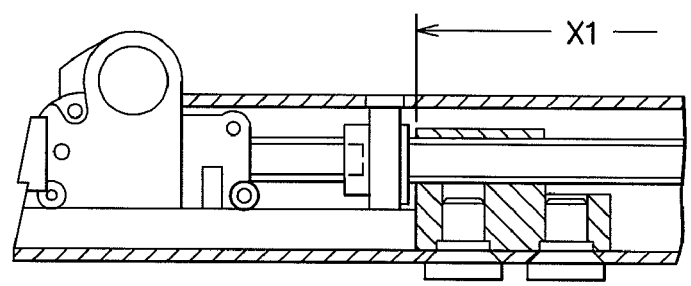

The transmission is illustrated without a housing in FIG. 13, the worm on the flexible shaft 50 having been omitted for greater clarity. The flexible shaft 50 is guided into the housing of the transmission via the flexible shaft adapter 52, already referred to. A bayonet connection 60 with grips 62 takes care of mounting the flexible shaft to the housing of the transmission 30 in a suitable manner. In FIG. 16, once again, individual depictions, each in longitudinal section, are shown in order to make clear the accommodation of crash forces. Here it should be remarked that the notch 42 or relief in the upper rails 40 in the region of the thrust ring 34 is formed such that there is no contact between the thrust ring 34 and the upper rail 40 in the normally installed condition. Only in the case of a crash does the thrust ring 34 brace itself against the housing wall of the upper rail 40. As can be seen from FIG. 14, in particular from the depiction at the top right, the thrust ring 34 touches the upper rail 40 in the case of a crash with a contact surface that is segment-shaped at the left and right on the thrust ring 34. Thus the thrust ring 34 braces itself symmetrically against the left side wall and the right side wall of the upper rail 40.

Although the present invention has been illustrated and described with respect to several preferred embodiments thereof, various changes, omissions and additions to the form and detail thereof, may be made therein, without departing from the spirit and scope of the invention.

What is claimed is:

1. A longitudinal seat adjustment device for use in a motor vehicle that includes a chassis, said device comprising:
    a lower rail fixed to the chassis, inside the lower rail an upper rail attached to a seat is adapted to be propelled by a motor;
    a spindle sitting inside the upper rail and having its respective ends fixed to the lower rail, on which spindle a transmission fixedly coupled to the upper rail is arranged in axially movable fashion, wherein there are recesses in opposite side walls of the upper rail into which a thrust ring, fixed to the spindle and sitting with its principal surface transverse to the longitudinal axis of the spindle, intrudes and is pressed against the side walls of the upper rail in the case of a crash.

2. The device of claim 1, wherein at least one of the wall parts of the upper rail has a notch through which a flexible shaft coupled to the motor is guided.

3. The device according to claim 1, wherein the side walls of the upper rail include slotted bridges that are pressed into the interior of the upper rail, and wherein a housing for the transmission is braced against the slotted bridges.

4. A longitudinal seat adjustment device for use in a motor vehicle that includes a chassis, said adjustment device comprising:
    a lower rail fixed to the chassis, inside the lower rail is an upper rail to which a seat is attached, where the seat is adapted to be propelled by a motor;
    a spindle sitting inside the upper rail and having its respective ends fixed to the lower rail;
    a transmission fixedly coupled to the upper rail and arranged on the spindle in axially movable fashion, wherein the transmission is clampingly held in the upper rail and has a transmission housing whose opposite housing walls lie between wall parts of the upper rail and whose upper wall projects from the upper rail, and where the transmission includes a gear arrangement that translates rotational motion of a shaft connected to the motor into translational motion of the upper rail, the gear arrangement comprising a spindle nut having a thrust ring; and
    metal stirrups bent into an L-shape and formed oppositely in a corresponding recess in the upper rail, where between the stirrups the transmission housing is slipped with wall tapers and where the stirrups clampingly hold the transmission.

5. A longitudinal seat adjustment device for use in a motor vehicle that includes a chassis, said adjustment device comprising:
    a lower rail fixed to the chassis, inside the lower rail is an upper rail to which a seat is attached, where the seat is adapted to be propelled by a motor;
    a spindle sitting inside the upper rail and having its respective ends fixed to the lower rail;
    a transmission fixedly coupled to the upper rail and arranged on the spindle in axially movable fashion, wherein the transmission is clampingly held in the upper rail and has a transmission housing whose opposite housing walls lie between wall parts of the upper rail and whose upper wall projects from the upper rail, and where the transmission includes a gear arrangement that translates rotational motion of a shaft connected to the motor into translational motion of the upper rail, where the transmission has a spindle nut resting on the spindle with worm gear and a worm engaging with the worm gear; and
    a thrust ring integrally molded onto the spindle nut.

6. The device of claim 5, wherein the spindle nut and the thrust ring are made of metal.

7. The device of claim 6, wherein the worm gear is coaxially applied to the spindle nut by plastic injection.

8. A longitudinal seat adjustment device for use in a motor vehicle that includes a chassis, said adjustment device comprising:
- a lower rail configured to be fixed to the chassis, inside which lower rail is an upper rail, to which a seat is attached, and can be propelled by a motor;
- a spindle inside the upper rail and having its respective ends fixed to the lower rail; and
- a transmission fixedly coupled to the upper rail and arranged in axially movable fashion, wherein the transmission is clampingly held in the upper rail and has a transmission housing whose opposite housing walls lie between wall parts of the upper rail and whose upper wall projects from the upper rail, where the transmission housing comprises two plastic housing shells that engage each other in a direction that is parallel to an axis of the spindle.

9. A longitudinal seat adjustment device for use in a motor vehicle that includes a chassis, said adjustment device comprising:
- a lower rail configured to be fixed to the chassis, inside which lower rail is an upper rail that is configured to be attached to a seat;
- a spindle inside the upper rail and having its respective ends fixed to the lower rail; and
- a transmission fixedly coupled to the upper rail and arranged in axially movable fashion with respect to the lower rail, where the transmission is clampingly held in the upper rail and has a transmission housing whose opposite housing walls lie between wall parts of the upper rail and whose upper wall projects from the upper rail, where the transmission housing comprises two plastic housing shells that slidingly engage each other in a direction parallel to a longitudinal axis of the spindle.

10. The device of claim 5, wherein the transmission housing comprises two plastic housing shells, which are connected to one another by ultrasonic welding.

* * * * *

UNITED STATES PATENT AND TRADEMARK OFFICE
CERTIFICATE OF CORRECTION

PATENT NO. : 7,484,787 B2 Page 1 of 1
APPLICATION NO. : 11/608365
DATED : February 3, 2009
INVENTOR(S) : Hofschulte et al.

It is certified that error appears in the above-identified patent and that said Letters Patent is hereby corrected as shown below:

<u>Title page Item (57)</u>
Abstract, delete "scat" and insert --seat--

<u>Column 5</u>
Line 10, delete "FIG. 4, 4 the" and insert --FIG. 4, the--

Signed and Sealed this

Tenth Day of March, 2009

JOHN DOLL
*Acting Director of the United States Patent and Trademark Office*